Figure 1:
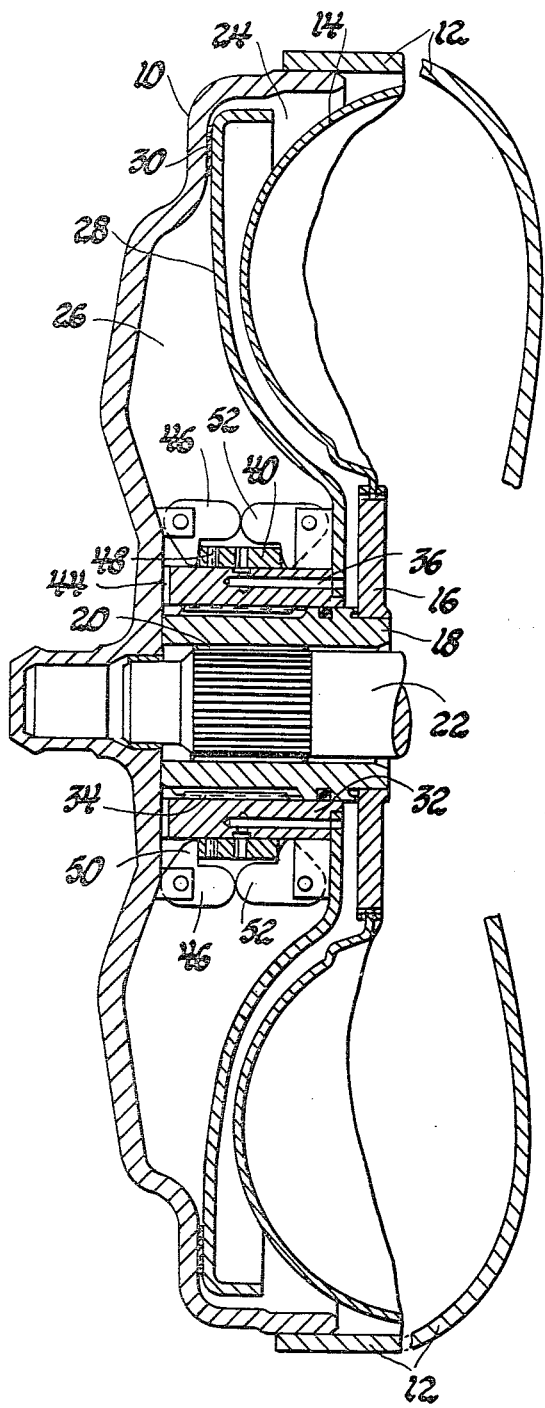

United States Patent [19]

Mathues

[11] 4,373,617

[45] Feb. 15, 1983

[54] CONTROLLED SLIP TORQUE CONVERTER CLUTCH

[75] Inventor: Thomas P. Mathues, Miamisburg, Ohio

[73] Assignee: General Motors Corporation, Detroit, Mich.

[21] Appl. No.: 269,344

[22] Filed: Jun. 1, 1981

[51] Int. Cl.³ .............................................. F16D 43/06
[52] U.S. Cl. ................................. 192/3.31; 192/105 C; 74/731
[58] Field of Search ............... 192/3.31, 103 R, 103 A, 192/3.28, 105 C; 74/731

[56] References Cited

U.S. PATENT DOCUMENTS

| | | | |
|---|---|---|---|
| 3,730,315 | 5/1973 | Annis et al. | 192/3.3 |
| 3,966,032 | 6/1976 | Koivunen | 192/3.3 |
| 3,977,502 | 8/1976 | Chana | 192/3.3 |
| 4,091,899 | 5/1978 | Stevenson | 192/3.3 |
| 4,181,203 | 1/1980 | Malloy | 192/3.3 |

*Primary Examiner*—George H. Krizmanich
*Attorney, Agent, or Firm*—Donald F. Scherer

[57] ABSTRACT

A torque converter clutch has an engagement chamber and a disengagement chamber. The clutch engagement force, and therefore torque capacity of the clutch, is established by the pressure differential between the engagement and disengagement chambers. Fluid flow from the engagement chamber to the disengagement chamber is controlled by a sliding valve member operated on by opposing governor weights which are rotated with respective input and output members of the torque converter. The valve member can be controlled to effect complete clutch engagement if desired.

4 Claims, 2 Drawing Figures

U.S. Patent       Feb. 15, 1983       4,373,617

CONTROLLED SLIP TORQUE CONVERTER CLUTCH

This invention relates to torque converter clutches and more particularly to torque converter clutches having a limited slip operating range.

It is well-known that a friction clutch member utilized in parallel with a torque converter can provide increased efficiency within the drive system. The torque converter clutch can be operated to provide a complete bypass of the torque converter or can be maintained slippingly engaged such that a portion of the torque transmitted passes through the torque converter. If complete clutch engagement is effected, it is necessary to incorporate a vibration damper in series drive arrangement with the clutch member. A slipping clutch alleviates the need for a vibration damper as this function is accommodated by the torque converter.

There are numerous control systems available which will maintain the torque converter clutch in a controlled slip mode. Such control systems are shown in U.S. Pat. Nos. 3,693,478 issued to Malloy in 1972; 3,966,031 issued to Peterson, Jr. et al. in 1976; 3,966,032 issued to Koivunen in 1976; and 4,091,899 issued to Stevenson in 1978.

These various controls provide either speed sensitive control or torque sensitive control. U.S. Pat. No. 3,966,032 provides a control which maintains a fixed percentage of slip speed between the input and output members. The engagement phase and disengagement phase of such torque converter clutches is accomplished by a flow reversal in the torque converter. Such flow reversal can be accomplished by utilizing the control system shown in U.S. Pat. Nos. 3,693,478 or 3,252,352 issued to General et al. in 1966. The present invention also utilizes a flow reversal such that when complete disengagement of the clutch is desired, fluid pressure is directed through the disengagement chamber prior to filling the torque converter.

The present invention provides for a speed sensitive control of a torque converter clutch which is responsive to the difference between clutch input speed and clutch output speed. The input and output of the clutch are provided with governor weights which apply opposing forces to a control valve member which is operable to control a restricted opening between the engagement and disengagement chambers such that the pressure differential therebetween is maintained in accordance with the speed differential between the input and output members. As is well-known, the pressure differential on a clutch pressure plate determines the torque transmitting capability of the clutch member. Thus, the clutch member of the present invention can be maintained in a controlled slip operating mode such that a portion of the torque is transmitted by the clutch while the remainder of the torque is transmitted by the torque converter in a parallel power path.

It is therefore an object of this invention to provide an improved control for a torque converter clutch wherein the engagement force of the torque converter clutch is established in response to the speed differential between the input and output members of the torque converter.

It is another object of this invention to provide an improved control for a torque converter clutch wherein a slidable valve member is operable to control the pressure differential on a clutch pressure plate during engagement of the clutch in response to speed sensitive force inducing members rotatable with respective input and output members of the torque converter resulting in a speed differential force on the valve member.

Figure 2:
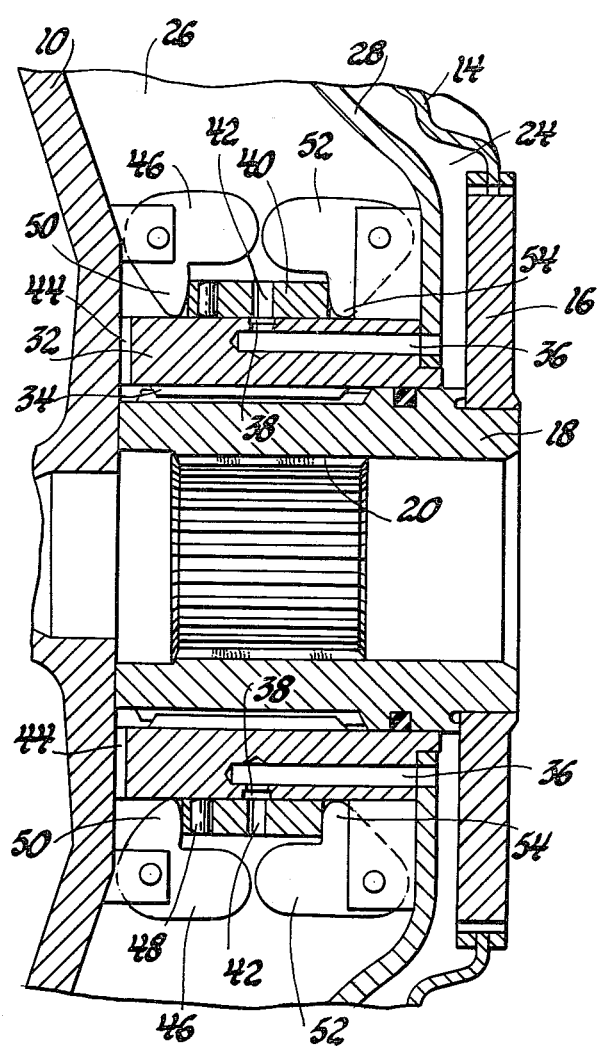

These and other objects and advantages of the present invention will be more apparent from the following description and drawings in which:

FIG. 1 is an elevational view of a portion of a torque converter and torque converter clutch with a control incorporating the present invention; and FIG. 2 is an enlarged view of a portion of FIG. 1.

Referring to FIG. 1, there is seen an input shell 10 adapted to be connected to a prime mover such as an internal combustion engine. The input shell 10 is secured to a torque converter impeller 12 which is of conventional design. The impeller 12 cooperates with a turbine 14 and a stator, not shown, to provide a conventional fluid drive. The turbine 14 includes a hub 16 which is secured to a sleeve shaft 18 having formed therein a spline 20. The spline 20 is drivingly connected to a transmission drive shaft 22, which in turn is connected to drive an automatic transmission such as that shown in U.S. Pat. No. 3,321,056 issued to Winchell et al. in 1967.

The space between the turbine 14 and the input shell 10 is divided into an engagement chamber 24 and a disengagement chamber 26 by a clutch pressure plate 28. The clutch pressure plate 28 has bonded thereto an annular friction surface 30 which is adapted to frictionally engage the inner surface of input shell 10. The pressure plate 28 is secured to a sleeve member 32 which in turn is splined at 34 to the sleeve shaft 18. The sleeve 32 has formed therein fluid passages 36 which are in fluid communication with the engagement chamber 24. Each passage 36 is intersected by a radially extending fluid passage 38 which communicates to the outer surface of sleeve 32.

An annular valve member 40 is disposed about the outer surface of sleeve 32 and is adapted to be axially slidable relative to sleeve 32. The valve member 40 is preferably nonrotatable relative to the sleeve 32 and has formed therein a plurality of restricted flow passages 42 which may be selectively aligned with the passages 38. When aligned with the passages 38, the passages 42 will permit fluid flow from chamber 24 through passages 36 and 38 to chamber 26. Fluid in chamber 26 passes through restricted flow passages 44 and is returned to the transmission sump or cooler in well-known manner. The amount of fluid flow between chambers 24 and 26 will be determined by the opening of passage 42 such that increasing the opening of passage 42 will result in a less pressure differential between chambers 24 and 26. The torque capacity of the torque converter clutch, comprised of pressure plate 28 and friction surface 30, will decrease as the pressure differential is reduced and vice versa.

The input shell 10 has pivotally disposed thereon a plurality of flyweights 46 which are adapted to urge valve member 40 rightward, as viewed in FIGS. 1 and 2. Since the flyweights 46 rotate at the speed of input shell 10, which may be substantially different from the rotating speed of valve member 40, a roller bearing assembly 48 is disposed between the valve member 40 and the operating arms 50 of the flyweights 46. The pressure plate 28 has pivotally mounted thereon a plurality of flyweights 52 each having an operating arm 54 which abut the valve member 40 and are operable to urge the valve member 40 leftward, as viewed in FIGS. 1 and 2.

When the valve member 40 moves rightward, the fluid flow between chambers 24 and 26 is reduced and if the valve member 40 moves sufficiently to the right, the fluid flow between these chambers can be completely shut off. As the valve member 40 moves to the left, the fluid flow between chambers 24 and 26 increases. As pointed out above, the pressure differential between chambers 24 and 26 is affected by the fluid flow. As the fluid flow between the chambers is completely shut off, the torque converter clutch will have its maximum torque capacity and will therefore attempt complete engagement. As the pressure differential between the chambers 24 and 26 decreases, that is, flow increases, the torque transmitting capacity of the torque converter clutch is reduced such that slipping engagement and thereby speed differential between the input shell 10 and turbine 14 is maintained.

The closing of valve 40 and therefore increasing of torque capacity is accomplished by the flyweights 46 which are rotating at input speed. The flyweights 52 cause the opposite effect on valve 40. Assuming that the torque converter control system, not shown, has called for engagement of the torque converter clutch, fluid flow to the torque converter will be reversed such that the disengagement chamber 26 will be connected to sump through passages 44, while engagement chamber 24 will be connected to the pressure source, not shown. It should be appreciated that at this time, the input shell 10 is rotating substantially faster than the turbine 14 and therefore pressure plate 28. If the flyweights 46 and 52 are substantially the same size, the force imposed on valve 40 by flyweights 46 will be greater than the force imposed on valve 40 by flyweights 52. The higher force imposed by flyweights 46 will cause valve 40 to move rightward such that the pressure differential between chambers 24 and 26 will be high resulting in engagement of the friction surface 30 with the input shell 10.

As a result of this frictional engagement, the torque converter clutch and turbine 14 will increase in speed and approach the speed of the input shell 10. As these two speeds approach unity, the force in flyweights 52 will become substantially equal to the force in flyweights 46 such that the valve member 40 will be moved slightly to increase the fluid flow between chambers 24 and 26 resulting in a decrease in the torque capacity and controlled slipping engagement of friction surface 30 with input shell 10. If the operator calls for increased input speed, the speed of flyweights 46 will increase and the valve 40 will be operated on as described above. The torque converter clutch will respond to the increased engine speed to again assume the desired slipping engagement.

If the engine speed should decrease, the force of flyweights 46 will decrease and since the clutch will slip relatively in the opposite direction, the flyweights 52 will be imposing a larger force on valve 40 resulting in opening of valve 40 and therefore disengagement of the friction surface 30 from the input shell 10. Thus, a coast release of the torque converter clutch is provided and, as is well-known, this is a desirable feature as it reduces drive line shock.

The operating characteristics and slip ratio of the torque converter clutch can be controlled by judicious selection of the flyweights. If desired, some of the input flyweights 46 can be spring loaded out of operation until a predetermined input speed is reached. Above this input speed they would become operable and could, if desired, enforce complete engagement of the torque converter clutch. The slip ratio between the torque converter clutch and the input shell 10 can be controlled by the mass of the flyweights and by their respective operating arms 50 and 54. It is also possible to spring load the valve member 40 in either direction. Also the size and shape of restricted passage 42 can be utilized to control flow capacity and therefore pressure differential.

It is also possible to design the valve member 40 such that the restricted passages 42 are never completely closed, thus providing a continuous minimum flow relationship between the chambers 24 and 26. It is possible to control this continuous flow relationship at a point providing the desired minimum speed differential between the torque converter clutch and the input shell 10.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A control for a slipping clutch and torque converter drive comprising; an engagement chamber for said slipping clutch; a disengagement chamber for said slipping clutch; means for directing fluid to said engagement chamber and from said disengagement chamber; valve means disposed adjacent said slipping clutch for controlling fluid communication from said engagement chamber to said disengagement chamber; output speed sensitive control means rotatable with said slipping clutch and operating on said valve means to increase the fluid communication with increasing rotary speed of said slipping clutch thereby reducing the torque capacity of the slipping clutch and increasing the speed differential in said torque converter; and input speed sensitive control means rotatable with the input of said torque converter and operating on said valve means to decrease the fluid communication with increasing rotary speed of the input thereby increasing the torque capacity and decreasing the speed differential in said torque converter, said input and output speed sensitive control means interacting to maintain the slipping clutch slippingly engaged so that the slipping clutch and the torque converter share in the torque transmitted.

2. A control for a slipping clutch and torque converter drive comprising; a pressure plate having a hub with a fluid passage; an engagement chamber on one side of said pressure plate; a disengagement chamber on the other side of said pressure plate; means for directing fluid to said engagement chamber and from said disengagement chamber; an annular valve slidably disposed on said hub for controlling fluid communication from said engagement chamber to said disengagement chamber; output speed sensitive control means rotatable with said pressure plate and operating on said annular valve to increase the fluid communication with increasing rotary speed of said pressure plate thereby reducing the torque capacity of the slipping clutch and increasing the speed differential between said pressure plate and the input of said torque converter; and input speed sensitive control means rotatable with the input of said torque converter and operating on said annular valve to decrease the fluid communication with increasing rotary speed of the input thereby increasing the torque capacity of the slipping clutch and decreasing the speed differential between said pressure plate and the input of said torque converter, said input and output speed sensitive control means interacting to maintain the slipping clutch slippingly engaged so that the slipping clutch and the torque converter share in the torque transmitted.

3. A control for a slipping clutch and torque converter drive comprising; a pressure plate having a hub with a fluid passage; an engagement chamber on the side of said pressure plate; a disengagement chamber on the other side of said pressure plate; means for direction fluid to said engagement chamber and from said disengagement chamber; an annular valve slidably disposed for axial movement on said hub for controlling fluid communication from said engagement chamber to said disengagement chamber; output flyweight means pivotally mounted on said pressure plate and being rotatable therewith, said output flyweight means having an operating arm abutting one end of said annular valve to urge said annular valve member in a direction to increase the fluid communication with increasing rotary speed of said pressure plate thereby reducing the torque capacity of the slipping clutch and increasing the speed differential between said pressure plate and the input of said torque converter; and input flyweight means pivotally mounted on and rotatable with the input of said torque converter and including operating arm means for urging said annular valve in a direction to decrease the fluid communication between said chambers with increasing rotary speed of the input thereby increasing the torque capacity of the slipping clutch and decreasing the speed differential between said pressure plate and the input of said torque converter, said input and output flyweight means interacting to maintain the slipping clutch slippingly engaged so that the slipping clutch and the torque converter share in the torque transmitted.

4. A control for a slipping clutch and torque converter drive comprising; an engagement chamber for said slipping clutch; a disengagement chamber for said slipping clutch; means for directing fluid to the engagement chamber and from said disengagement chamber; valve means disposed adjacent said slipping clutch for controlling fluid communication from said engagement chamber to said disengagement chamber; output speed sensitive control means rotatable with said slipping clutch and operating on said valve means to increase the fluid communication with increasing rotary speed of said slipping clutch thereby reducing the torque capacity of the slipping clutch and increasing the speed differential in said torque converter; and input speed sensitive control means rotatable with the input of said torque converter and operating on said valve means to decrease the fluid communication with increasing rotary speed of the input thereby increasing the torque capacity and decreasing the speed differential in said torque converter, said input and output speed sensitive control means including flyweight means interacting to maintain the slipping clutch slippingly engaged during a portion of the operating speed range of the torque converter so that the slipping clutch and the torque converter share in the torque transmitted during the slipping engagement.

* * * * *

UNITED STATES PATENT AND TRADEMARK OFFICE
CERTIFICATE OF CORRECTION

PATENT NO. : 4,373,617
DATED : February 15, 1983
INVENTOR(S) : Thomas P. Mathues It is certified that error appears in the above—identified patent and that said Letters Patent is hereby corrected as shown below:

Column 5, lines 12 and 13, "on the side" should read -- on one side --.

Column 5, line 13, "direction" should read -- directing --.

Signed and Sealed this

Twentieth Day of December 1983

[SEAL]

Attest:

Attesting Officer

GERALD J. MOSSINGHOFF

Commissioner of Patents and Trademarks